United States Patent
Zhang et al.

(10) Patent No.: US 11,720,187 B2
(45) Date of Patent: Aug. 8, 2023

(54) TOUCHPAD ASSEMBLY AND ELECTRONIC DEVICE

(71) Applicant: Huawei Technologies Co., Ltd., Shenzhen (CN)

(72) Inventors: Yingchun Zhang, Wuhan (CN); Lei Bai, Wuhan (CN); Junchao Luo, Shenzhen (CN); Teng Long, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/827,319

(22) Filed: May 27, 2022

(65) Prior Publication Data
US 2022/0291763 A1 Sep. 15, 2022

Related U.S. Application Data (63) Continuation of application No. PCT/CN2020/128057, filed on Nov. 11, 2020.

(30) Foreign Application Priority Data

Nov. 29, 2019 (CN) .......................... 201911205472.X (51) Int. Cl.
*G06F 3/0354* (2013.01)
*G06F 1/16* (2006.01)

(52) U.S. Cl.
CPC .......... *G06F 3/03547* (2013.01); *G06F 1/169* (2013.01)

(58) Field of Classification Search
CPC .... G06F 3/03547; G06F 1/169; G06F 1/1616; G06F 1/1635; G06F 1/1658; G06F 1/1681; G06F 1/1633
See application file for complete search history.

(56) References Cited

U.S. PATENT DOCUMENTS 8,294,675 B2 * 10/2012 Mathew ................ G06F 1/1616
178/18.08
8,829,378 B2 * 9/2014 Villain .................... G06F 3/041
345/173

(Continued)

FOREIGN PATENT DOCUMENTS

CN 203309464 U 11/2013
CN 103809684 A 5/2014

(Continued)

*Primary Examiner* — Rodney Amadiz
(74) *Attorney, Agent, or Firm* — Conley Rose, P.C.

(57) ABSTRACT

A touchpad assembly includes a baseplate, a support, and a balance bar. The baseplate includes a first plate body and a second plate body. The first plate body is higher than the second plate body in a thickness direction of the touchpad assembly, and the first plate body is configured to accommodate a battery of the electronic device. The support is disposed on a side of the baseplate, the balance bar is supported between the support and the baseplate, and is capable of rotating around a set fulcrum of the baseplate. The balance bar includes a main body portion and supporting portions. At least part of each of the supporting portions is located on the first plate body. An end of each of the supporting portions that extends away from the main body portion does not extend past a bottom surface of the first plate body in the thickness direction.

20 Claims, 6 Drawing Sheets

(56) References Cited

U.S. PATENT DOCUMENTS

| | | | |
|---|---|---|---|
| 9,582,045 B2* | 2/2017 | Doi | G06F 1/1679 |
| 9,857,893 B2* | 1/2018 | Senatori | G06F 1/1633 |
| 10,649,501 B1* | 5/2020 | Chen | G06F 1/169 |
| 11,520,383 B1* | 12/2022 | Li | G06F 3/03547 |
| 2006/0038776 A1 | 2/2006 | Ahn et al. | |
| 2014/0133112 A1 | 5/2014 | Kao et al. | |
| 2014/0160653 A1 | 6/2014 | Wong et al. | |
| 2018/0213072 A1 | 7/2018 | Shi et al. | |
| 2020/0183510 A1 | 6/2020 | Chen et al. | |

FOREIGN PATENT DOCUMENTS

| | | |
|---|---|---|
| CN | 203706964 U | 7/2014 |
| CN | 206339954 U | 7/2017 |
| CN | 207281658 U | 4/2018 |
| CN | 108268179 A | 7/2018 |
| JP | 2016143392 A | 8/2016 |
| WO | 2019045710 A1 | 3/2019 |

* cited by examiner

TOUCHPAD ASSEMBLY AND ELECTRONIC DEVICE

CROSS-REFERENCE TO RELATED APPLICATIONS

This is a continuation of International Patent Application No. PCT/CN2020/128057 filed on Nov. 11, 2020, which claims priority to Chinese Patent Application No. 201911205472.X filed on Nov. 29, 2019. The disclosures of the aforementioned applications are hereby incorporated by reference in their entireties.

TECHNICAL FIELD

This disclosure relates to the technical field of electronic devices, and in particular, to a touchpad assembly and an electronic device.

BACKGROUND

As a portable electronic product, a notebook computer is deeply liked by users, and brings convenient and fast office and entertainment experience to the users. In the process of pursuing portability, notebook computers gradually tend to be extremely thin and light. This puts forward higher requirements for optimization and improvement of a structure of each part of the product. A touchpad is a key moving part in the notebook computer, and moving space of the touchpad has relatively great impact on a thickness of the entire notebook computer and user experience.

SUMMARY

An objective of this disclosure is to provide a touchpad assembly and an electronic device, so that an entire thickness of the touchpad assembly and a battery that are assembled is reduced by reducing a thickness of an end portion of a balance bar through compression.

The foregoing objective and another objective are achieved based on features in the independent claims. Further implementations are provided in the dependent claims, the specification, and the accompanying drawings.

According to a first aspect, a touchpad assembly is provided, which is used for an electronic device and includes a baseplate, where the baseplate includes a first plate body and a second plate body, the first plate body is higher than the second plate body in a thickness direction (H) of the touchpad assembly, and the first plate body is configured to match a battery of the electronic device, a support disposed on a side of the baseplate, and a balance bar, where the balance bar is supported between the support and the baseplate, and is capable of rotating around a set fulcrum of the baseplate, where the balance bar includes a main body portion and supporting portions connected to two ends of the main body portion, at least part of the supporting portion is located on the first plate body, and in the thickness direction (H) of the touchpad assembly, and an end of the supporting portion away from the main body portion does not exceed a bottom surface of the first plate body.

Because an existing touchpad assembly has a risk of interference between a balance bar and a battery, to reduce the risk of interference between the two, only a distance between the baseplate and the support can be increased, which increases an entire thickness of the touchpad assembly, and is not conducive to entire lightening and thinning of the electronic device. In addition, when the battery is designed close to an edge of the entire electronic device, an end of the battery is in contact with the second plate body, causing the entire electronic device to be thicker. The balance bar according to this disclosure includes the main body portion and the supporting portions, and the end of the supporting portion away from the main body portion does not exceed the bottom surface of the first plate body, so that the balance bar does not interfere with the battery. Therefore, there is no need to increase the distance between the baseplate and the support, thereby reducing the entire thickness of the touchpad assembly and the battery that are assembled.

In a possible implementation, the supporting portion includes a first rod body and a second rod body connected to the first rod body, the first rod body is connected to the main body portion by using a first end portion, and an end of the second rod body away from the first rod body is a second end portion, and the second end portion does not exceed the bottom surface of the first plate body.

The second end portion of the second rod body is the bottommost end of the supporting portion. Because the second end portion does not exceed the bottom surface of the first plate body, the supporting portion does not interfere with the battery, thereby making the entire electronic device lighter and thinner.

In a possible implementation, in the thickness direction (H) of the touchpad assembly, a thickness of the second rod body is smaller than that of the first rod body.

Because the second rod body with a smaller thickness is provided, when the supporting portion penetrates through the first plate body, the second end portion of the second rod body is capable of not exceeding the bottom surface of the first plate body, thereby avoiding interfering with the battery, which is conductive to lightening and thinning of the entire electronic device. In addition, a ratio of a length of the first rod body to a length of the second rod body can be as large as possible. In this case, a width of the first plate body can be made as large as possible, so that larger space is provided to accommodate the battery, which can increase a battery capacity, thereby increasing a standby time of the entire electronic device.

In a possible implementation, the first rod body is in a shape of a cylinder, and the second rod body is in a shape of an elliptical column or a cylinder.

The arrangement of the shape of the cylinder or the elliptical column can facilitate processing.

In a possible implementation, the baseplate is provided with a clamping portion, and the set fulcrum is located at the clamping portion, and the second rod body is provided with a mounting portion, and the mounting portion matches the clamping portion.

When the touchpad assembly is pressed, the touchpad drives the support to move downward, thereby driving the first end of the supporting portion to move downward, driving the balance bar to rotate around the mounting portion, and driving the second end portion to move upward to implement clicking, and the mounting portion matches the clamping portion when the supporting portion rotates, so that the entire touchpad assembly provides good hand feeling when moving downward.

In a possible implementation, the baseplate is provided with a through-hole, and the through-hole runs through the first plate body and the second plate body, the second plate body includes an extension plate, and the extension plate is accommodated in the through-hole, and the clamping portion is disposed on the extension plate.

The arrangement of the extension plate can facilitate the arrangement of the clamping portion, and the arrangement of the through-hole can reduce an entire weight of the touchpad assembly.

In a possible implementation, the clamping portion may further have a notch, and a shape of the notch can match the mounting portion to enable the clamping portion and the mounting portion to be clamped, thereby enabling the supporting portion to rotate.

In a possible implementation, the extension plate is integrally formed with the second plate body.

The second plate body and the extension plate that are integrally formed have the advantages of high strength and less susceptibility to deformation.

In a possible implementation, the baseplate further includes a step region, and the step region is connected between the first plate body and the second plate body.

In this disclosure, to stagger a position of the battery and that of the second plate body to make the battery match the first plate body, a width of the second plate body needs to be compressed, that is, the step region is as close as possible to the second plate body, so that the position of the battery is staggered with that of the second plate body, and a region below the first plate body is larger and can accommodate the battery. When the battery is not in contact with the step region or the second plate body, but only located on a side edge at which the first plate body is connected to the step region, the entire electronic device is lighter and thinner. In addition, the arrangement of the step region can make the supporting portion inclined, so that a hand feeling effect is good.

In a possible implementation, the support includes a clamping groove, and the main body portion is clamped in the clamping groove.

When the touchpad assembly is pressed, the main body portion can rotate in the clamping groove, thereby enabling the supporting portion to rotate, so that the entire touchpad assembly provides good hand feeling when moving downward.

In a possible implementation, one of the baseplate and the support is provided with a clamping hole, the other is provided with a clamping block, and the clamping hole is clamped and matched with the clamping block.

The clamping hole is clamped and matched with the clamping block, so that limiting matching between the baseplate and the support is implemented, and the two can alternatively be combined through bonding by using adhesive.

In a possible implementation, the touchpad assembly further includes a circuit board, where the circuit board is connected to a side of the support away from the baseplate.

A switch is disposed on the circuit board, and the switch can be attached to a surface of the circuit board. When the touchpad assembly is pressed, the touchpad assembly can rotate slightly, which triggers operation of the switch, to implement an input function of a keyboard or a click function of a mouse.

In a possible implementation, the touchpad assembly includes a touchpad, where the touchpad is connected to a side of the circuit board away from the support.

The touchpad, the circuit board, the support, and the baseplate are connected in sequence to form the touchpad assembly.

According to a second aspect, an electronic device is further provided, including a display terminal and a system terminal, where the display terminal is rotatably connected to the system terminal, and the display terminal includes a display screen, which converts a video signal output by the system terminal into an image, the system terminal includes a battery, a keyboard, and the touchpad assembly, and the battery is installed below the first plate body of the touchpad assembly.

The battery is installed between the first plate body and a lower housing of the electronic device, the battery and the second plate body are staggered, and the second end portion of the supporting portion of the balance bar does not exceed the bottom surface of the first plate body, so that the battery does not interfere with the second end portion of the supporting portion. This makes the touchpad assembly lighter and thinner, thereby making the entire electronic device lighter and thinner.

The technical solutions provided in this disclosure may achieve the following beneficial effects.

The touchpad assembly according to this disclosure includes a baseplate, a support, and a balance bar, where the balance bar is installed between the support and the baseplate, so that the touchpad assembly forms an integral module. Because an existing touchpad assembly has a risk of interference between a balance bar and a battery, to reduce the risk of interference between the two, only a distance between the baseplate and the support can be increased, which increases an entire thickness of the touchpad assembly, and is not conducive to entire lightening and thinning of the electronic device. In this disclosure, an entire thickness of the touchpad assembly and the battery that are assembled is reduced by reducing a thickness of an end portion of the balance bar through compression, without the need to increase the distance between the baseplate and the support.

It should be understood that the foregoing general description and the following detailed description are merely examples, and cannot limit this disclosure.

Reference numerals: 100—Electronic device; 10—System terminal; 1—Touchpad assembly; 11—Baseplate; 111—First plate body; 112—Second plate body; 112a—Extension plate; 112b—Clamping portion; 113—Step region; 114—Through-hole; 115—Clamping hole; 12—Support; 121—Clamping groove; 122—Clamping block; 13—Balance bar; 131—Main body portion; 132—Supporting portion; 132a—First rod body; 132b—Second rod body; 132c—First end portion; 132d—Second end portion; 132e—Mounting portion; 14—Circuit board; 141—Switch; 15—Touchpad; 2—Keyboard; 3—Battery; and 20—Display terminal.

The accompanying drawings herein are incorporated into the specification and form a part of the specification, show embodiments conforming to this disclosure, and are used together with the specification to explain a principle of this disclosure.

DESCRIPTION OF EMBODIMENTS

To better understand the technical solutions of this disclosure, the following describes embodiments in detail with reference to the accompanying drawings.

The terms used in embodiments of this disclosure are merely for the purpose of illustrating specific embodiments, and are not intended to limit this disclosure. The terms "a" and "the" of singular forms used in the embodiments and the appended claims are also intended to include plural forms, unless otherwise specified in the context clearly.

It should be understood that the term "and/or" in this specification describes only an association relationship for describing associated objects and represents that three relationships may exist. For example, A and/or B may represent the following three cases: only A exists, both A and B exist, and only B exists. In addition, the character "/" in this specification usually indicates an "or" relationship between the associated objects.

It should be noted that, position words such as "above", "below", "left", and "right" described in embodiments of this disclosure are described from angles shown in the accompanying drawings, and should not be construed as a limitation on embodiments. Moreover, in the context, it also should be understood that, when it is mentioned that one element is connected "above" or "below" another element, it cannot only be directly connected "above" or "below" the other element, but also be indirectly connected "above" or "below" the another element by using an intermediate element.

Figure 1:
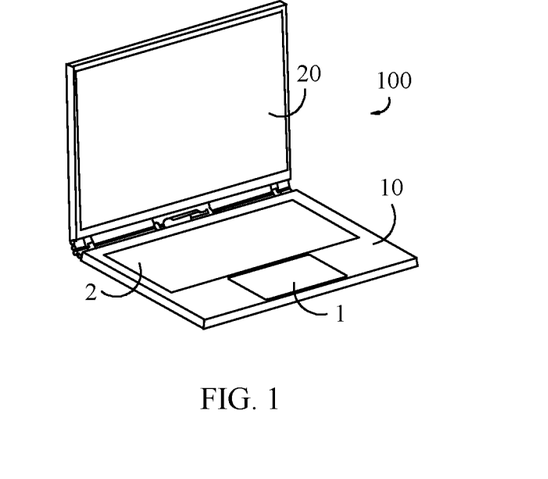
FIG. 1 is a schematic diagram of a structure of an electronic device according to an embodiment.

FIG. 1 is a schematic diagram of a structure of an electronic device according to an embodiment of this disclosure. As shown in FIG. 1, this embodiment provides an electronic device 100, and the electronic device 100 may be a notebook computer or another electronic product. Taking a notebook computer as an example, the electronic device 100 may include a display terminal 20 and a system terminal 10, where the display terminal 20 is rotatably connected to the system terminal 10, and the display terminal 20 includes a display screen, which converts a video signal output by the system terminal 10 into an image. The system terminal 10 includes a keyboard 2 and a touchpad assembly 1. The touchpad assembly 1 is provided mainly to improve portability of the electronic device 100, and to control the electronic device 100 instead of a mouse, or the touchpad assembly 1 cooperates with the mouse to further improve portability of the electronic device.

Figure 2:
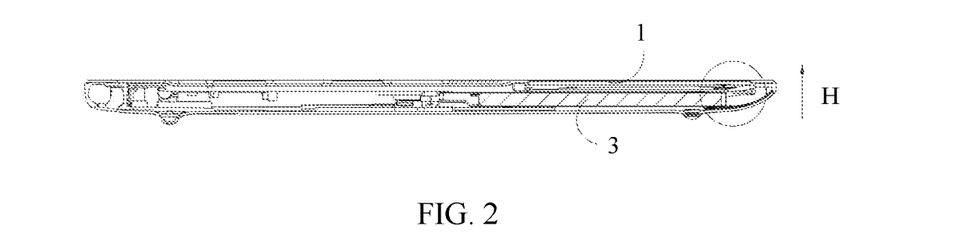
FIG. 2 is a sectional view of a system terminal of an electronic device according to an embodiment.

FIG. 2 is a sectional view of a system terminal of an electronic device according to an embodiment. As shown in FIG. 2, to make proper use of space, a battery 3 of the electronic device 100 may be arranged below the touchpad assembly 1, that is, between the touchpad assembly 1 and a lower housing of the electronic device 100.

Figure 3:
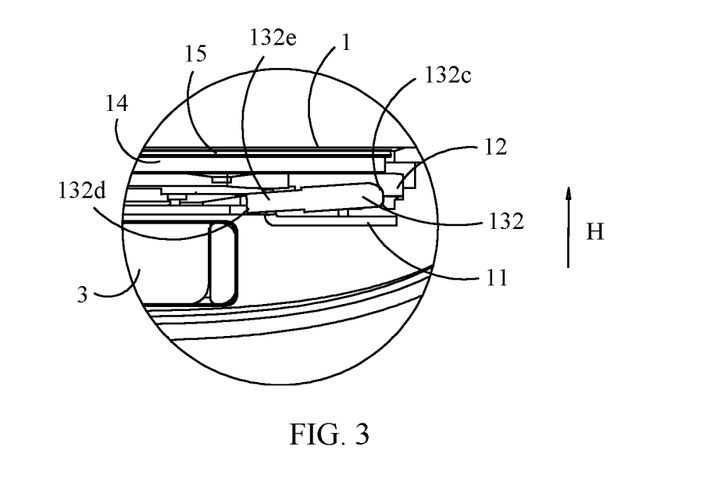
FIG. 3 is a partial enlarged view of the system terminal shown in FIG. 2.

FIG. 3 is a partial enlarged view of the system terminal shown in FIG. 2. As shown in FIG. 3, the touchpad assembly 1 includes a baseplate 11, a support 12, and a balance bar 13 (see FIG. 5). The support 12 is installed above the baseplate 11 in a thickness direction (H) of the touchpad assembly 1, and the balance bar 13 is located in an installation region between the baseplate 11 and the support 12. In the thickness direction (H) of the touchpad assembly 1, a touchpad 15 and the baseplate 11 are oppositely arranged, and installation space is provided between the two. The support 12 and the balance bar 13 are located in the installation space, and a circuit board 14 is located between the baseplate 11 and the touchpad 15. Two ends of the balance bar 13 are provided with supporting portions 132, and the supporting portion 132 is provided with a first end portion 132c and a second end portion 132d in an axial direction thereof. A mounting portion 132e is provided between the first end portion 132c and the second end portion 132d. The mounting portion 132e is connected to the baseplate 11. The first end portion 132c and the second end portion 132d can rotate around the mounting portion 132e, and have opposite rotation directions. In addition, the first end portion 132c of the balance bar 13 is connected to the support 12. With a click on the electronic device 100 by using the touchpad assembly 1 as an example, a user presses the touchpad 15, and the touchpad 15 drives the support 12 to move downward, to drive the first end portion 132c of the supporting portion 132 to move downward, drive the balance bar 13 to rotate around the mounting portion 132e, and make the second end portion 132d move upward, thereby implementing the click, and displaying a corresponding operation on the display terminal 20.

Figure 4:
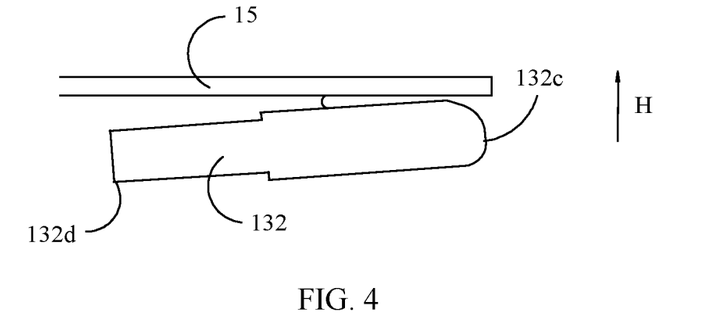
FIG. 4 is a schematic diagram of a touchpad and supporting portions shown in FIG. 3.

FIG. 4 is a schematic diagram of a touchpad and supporting portions shown in FIG. 3. To improve user experience in pressing the touchpad 15, the supporting portion 132 can be obliquely arranged in the thickness direction (H), and the second end portion 132d is located below the first end portion 132c, that is, a preset included angle α is provided between the supporting portion 132 and the touchpad 15. When the user presses the touchpad 15, the setting of the preset included angle makes the first end portion 132c of the supporting portion 132 move downward by a set stroke. If the stroke is excessively short, it is difficult for the user to have pressing experience. Therefore, to improve the pressing experience of the user, the preset included angle should not be excessively small, that is, a distance between the baseplate 11 and the touchpad 15 should not be excessively small.

At present, through the arrangement of the balance bar 13, an existing touchpad assembly 1 transmits torque when a single side is pressed (that is, when an end of the balance bar 13 is pressed, the entire balance bar 13 rotates slightly), so that the touchpad assembly 1 can move downward synchronously, to achieve the purpose of improving user experience. The balance bar 13 is installed between the support 12 and the baseplate 11, so that the touchpad assembly 1 forms an integral module. As notebook computers are gradually becoming lighter and thinner, the thickness of the integral module becomes a key factor that affects lightening and thinning of the entire electronic device. The balance bar 13 of the existing touchpad assembly 1 is relatively thick, and the baseplate 11 cannot be effectively staggered from a battery. As a result, the touchpad assembly 1 occupies thickness space at the system terminal 10, affecting lightening and thinning of the entire electronic device. In addition, the existing balance bar 13 is roughly cylindrical, and after the balance bar 13 is arranged obliquely, a risk that the second end portion 132d of the supporting portion 132 extends below the baseplate 11 exists, and thus a risk that the balance bar 13 interferes with the battery 3 exists. The risk of interference between the two can be reduced by increasing the distance between the baseplate 11 and the touchpad 15. The method also increases an entire thickness of the touchpad assembly 1, which is not conducive to entire lightening and thinning of the electronic device.

However, in the touchpad assembly and the electronic device according to this embodiment, the thickness of the electronic device is reduced mainly by improving the structure of the touchpad assembly 1.

Figure 5:
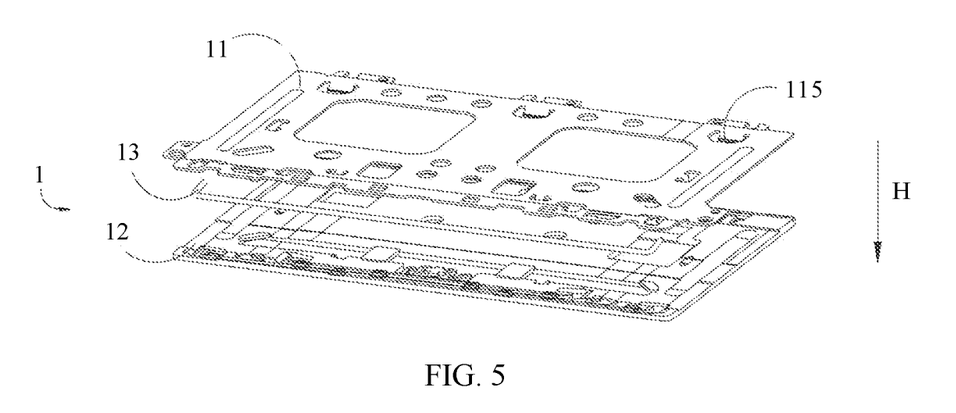
FIG. 5 is an exploded view of a touchpad assembly according to an embodiment.

FIG. 5 is an exploded view of a touchpad assembly according to an embodiment. As shown in FIG. 4, this embodiment provides a touchpad assembly 1, and a balance bar 13 is located between a baseplate 11 and a support 12.

Figure 6:
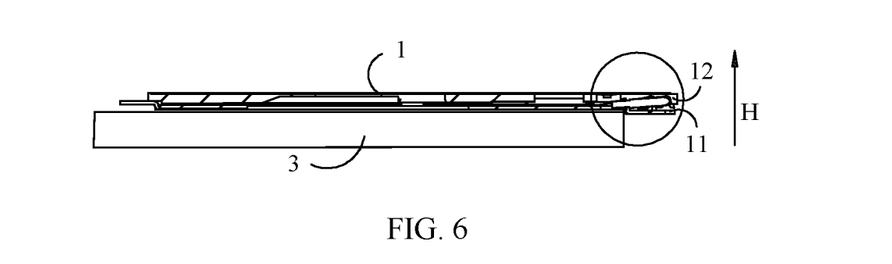
FIG. 6 is a sectional view of a battery installed below a touchpad assembly according to an embodiment.

FIG. 6 is a sectional view of a battery installed below a touchpad assembly according to an embodiment. As shown in FIG. 6, the battery 3 is disposed on a side of the baseplate 11 away from the support 12, and a positional relationship between the baseplate 11 and the support 12 in FIG. 5 is opposite to a positional relationship between the baseplate 11 and the support 12 in FIG. 6.

Figure 7:
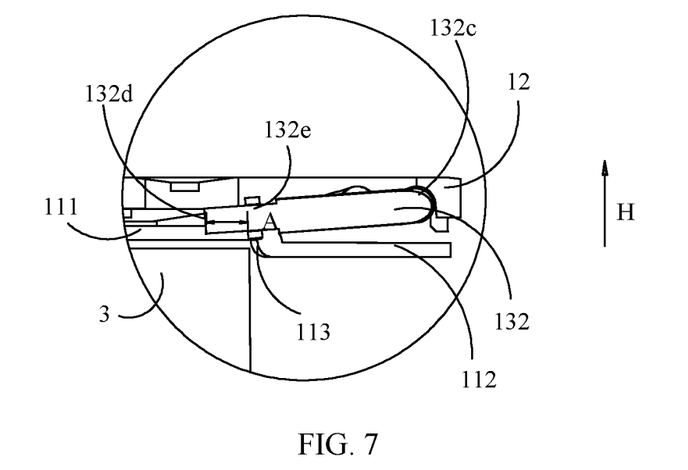
FIG. 7 is a partial enlarged view of the touchpad assembly shown in FIG. 6.

FIG. 7 is a partial enlarged view of the touchpad assembly shown in FIG. 6. As shown in FIG. 7, the baseplate 11 includes a first plate body 111, a step region 113, and a second plate body 112. The step region 113 connects the first plate body 111 to the second plate body 112, and in the thickness direction (H) of the touchpad assembly 1, the first plate body 111 is higher than the second plate body 112 with the battery 3 as a reference plane. The battery 3 is located between the first plate body 111 and the lower housing of the electronic device 100, and the balance bar 13 is located between the second plate body 112 and the support 12.

In this embodiment, an end of the battery 3 is located on a side edge of the first plate body 111 (the side edge connected to the step region 113), and is not in contact with the step region 113 and the second plate body 112, so that the battery 3 does not interfere with the step region 113 and the second plate body 112. The support 12 is disposed on a side of the baseplate 11. The balance bar 13 is supported between the support 12 and the baseplate 11, and is capable of rotating around the mounting portion 132e of the baseplate 11. When the support 12 is pressed, the balance bar 13 slightly rotates. When an end of the balance bar 13 is pressed, the entire balance bar 13 slightly rotates.

When the battery 3 is designed close to an edge of the entire electronic device, if an end of the battery 3 is in contact with the second plate body 112, the entire electronic device is caused to be thicker. To stagger a position of the battery 3 from that of the second plate body 112 and make the battery 3 match the first plate body 111, a width of the second plate body 112 needs to be reduced. In other words, the step region 113 should be as close as possible to the second plate body 112, so that an end of the battery 3 is located on a side edge of the first plate body 111 (the side edge connected to the step region 113). In this case, the balance bar 13 may penetrate through the first plate body 111, causing interference with the battery 3. In the touchpad assembly 1 according to this embodiment, the position of the battery 3 is staggered from that of the second plate body 112, and the second end portion 132d of the supporting portion 132 of the balance bar 13 does not exceed the bottom surface of the first plate body 111 in the thickness direction (H) of the touchpad assembly 1. In this way, the battery 3 does not interfere with the second end portion 132d, thereby making the entire electronic device 100 lighter and thinner.

The existing balance bar 13 is arranged to be cylindrical, and after the balance bar 13 is arranged obliquely, a risk that the second end portion 132d of the supporting portion 132 extends below the baseplate 11 exists, and thus a risk that the balance bar 13 interferes with the battery 3 exists. Therefore, the second end portion 132d can be prevented from extending below the baseplate 11 by reducing the thickness of the second end portion 132d, thereby making the entire electronic device 100 lighter and thinner.

The step region 113 is arranged to make the supporting portion 132 inclined, so that a hand feeling effect is good. In this embodiment, the step region 113 is closer to the second plate body 112, so that a region below the first plate body 111 is larger and can accommodate the battery 3. When the battery 3 is not in contact with the step region 113 or the second plate body 112, but only located on the side edge of the first plate body 111 (the side edge connected to the step region 113), the entire electronic device is lighter and thinner.

Figure 8:
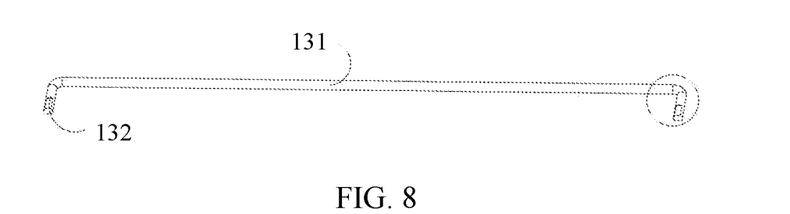
FIG. 8 is a schematic diagram of a structure of a balance bar of a touchpad assembly according to an embodiment.

FIG. 8 is a schematic diagram of a structure of a first balance bar of a touchpad assembly according to an embodiment. As shown in FIG. 8, the balance bar 13 includes a main body portion 131 and supporting portions 132 connected to two ends of the main body portion 131. The main body portion 131 and the supporting portions 132 may be integrally formed to form a substantially U-shaped bar. Also referring to FIG. 7, at least part A of the supporting portion 132 is located on the first plate body 111, and the second end portion 132d of the supporting portion 132 does not exceed the bottom surface of the first plate body 111 in the thickness direction (H) of the touchpad assembly 1.

Figure 9:
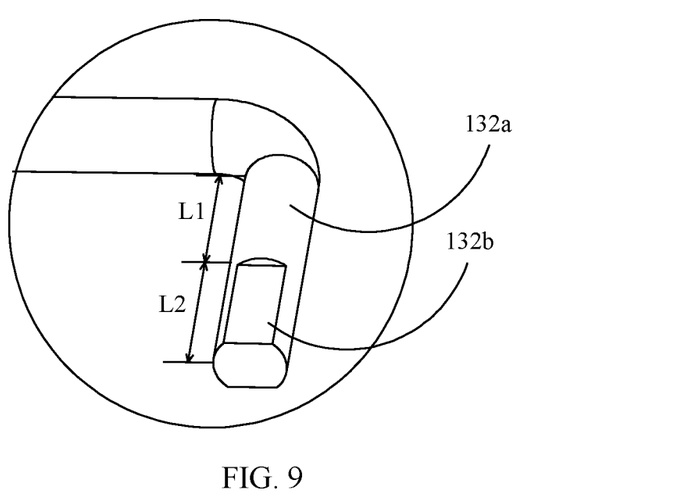
FIG. 9 is a partial enlarged view of a first structure of the balance bar shown in FIG. 8.

FIG. 9 is a partial enlarged view of a first structure of the balance bar shown in FIG. 8. As shown in FIG. 9, the supporting portion 132 includes a first rod body 132a and a second rod body 132b. A first end of the first rod body 132a is a first end portion 132c, and the first end portion 132c is connected to the main body portion 131. A second end of the first rod body 132a is connected to a first end of the second rod body 132b, and a second end of the second rod body 132b is a second end portion 132d. The second end portion 132d does not exceed the bottom surface of the first plate body 111, and a thickness of the second rod body 132b is smaller than that of the first rod body 132a in the thickness direction (H) of the touchpad assembly 1.

The first rod body 132a and the second rod body 132b can be formed through machining, for example, the second rod body 132b with a smaller thickness can be formed by using a process such as lathing, grinding, or milling. Because the second rod body 132b with a smaller thickness is provided, when the supporting portion 132 penetrates through the first plate body 111, the second end portion 132d of the second rod body 132b is capable of not exceeding the bottom surface of the first plate body 111, thereby avoiding interfering with the battery 3, which is conductive to lightening and thinning of the entire electronic device. In this embodiment, the main body portion 131 and the first rod body 132a are each in a shape of a cylinder, and the second rod body 132b may be in a shape of a cylinder, an elliptical column, or a special-shaped column.

The second rod body 132b can thin the supporting portion 132 by using compute numerical control (CNC). An upper surface and a lower surface of the thinned second rod body 132b each have a planar structure. After the balance bar 13 is installed on the support 12 and the baseplate 11, the second end portion 132d of the second rod body 132b is not lower than a height of the bottom surface of the first plate body 111, which can prevent the balance bar 13 from interfering with the battery 3.

The first rod body 132a has a length of L1, the second rod body 132b has a length of L2, and a ratio of L2 to L1 can be as large as possible. In this case, the step region 113 between the first plate body 111 and the second plate body 112 may be closer to the second plate body 112, so that a width of the first plate body 111 can be as large as possible. Therefore, larger space is provided to accommodate the battery 3, and a capacity of the battery 3 can be increased, thereby increasing a standby time of the entire electronic device.

Figure 10:
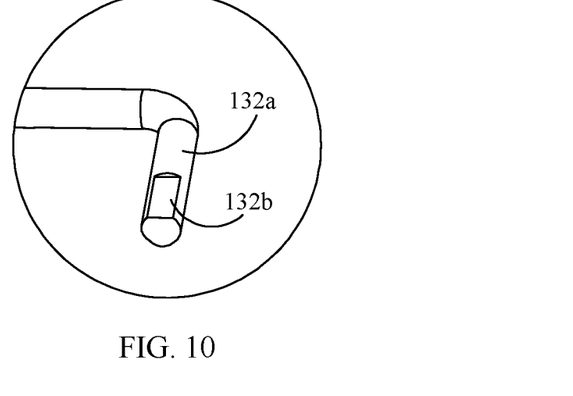
FIG. 10 is a partial enlarged view of a second structure of the balance bar shown in FIG. 8.

FIG. 10 is a partial enlarged view of a second structure of the balance bar shown in FIG. 8. As shown in FIG. 10, the supporting portion 132 includes a first rod body 132a and a second rod body 132b. The second rod body 132b can reduce a thickness of part of the supporting portion 132 by forging and pressing the supporting portion 132. In this case, an upper surface or a lower surface of the second rod body 132b has a planar structure (in FIG. 10, only the upper surface of the second rod body 132b has a planar structure). Therefore, after the balance bar 13 is installed on the support 12 and the baseplate 11, a second end portion 132d of the second rod body 132b is not lower than the height of the bottom surface of the first plate body 111, which can prevent the balance bar 13 from interfering with the battery 3.

That the upper surface and/or the lower surface has a planar structure is only used as an example for description, and the specific shape of the upper surface and/or the lower surface is not limited, as long as a distance between the upper surface and the lower surface is smaller than a diameter of the first rod body 132a. Examples are not provided herein for description.

Figure 11:
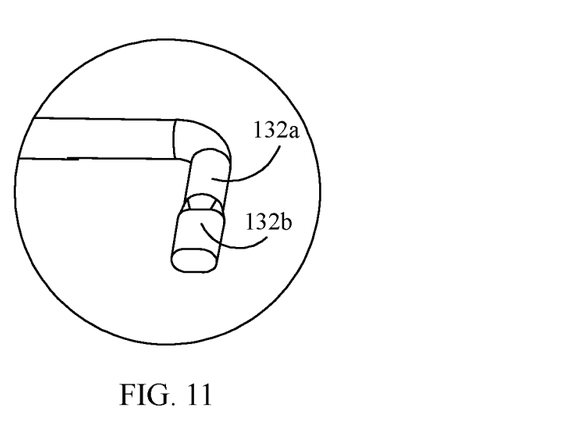
FIG. 11 is a partial enlarged view of a third structure of the balance bar shown in FIG. 8.

FIG. 11 is a partial enlarged view of a third structure of the balance bar shown in FIG. 8. As shown in FIG. 11, the supporting portion 132 includes a first rod body 132a and a second rod body 132b. The second rod body 132b can reduce a thickness of part of the supporting portion 132 by forging and pressing the supporting portion 132. In this case, an upper surface and a lower surface of the second rod body 132b each have a planar structure, and an end face of the second rod body 132b is similar to an elliptical structure. Therefore, after the balance bar 13 is installed on the support 12 and the baseplate 11, a second end portion 132d of the second rod body 132b is not lower than the height of the bottom surface of the first plate body 111, which can prevent the balance bar 13 from interfering with the battery 3.

Figure 12:
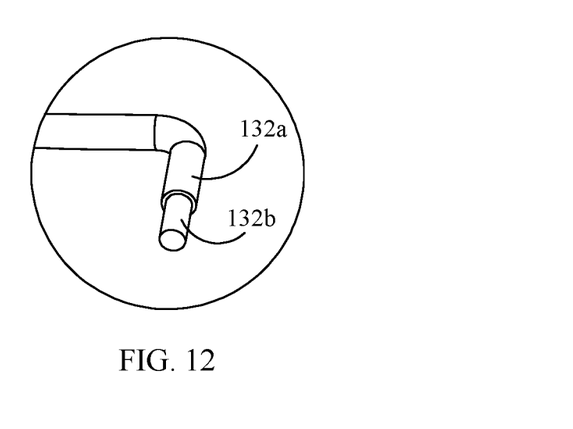
FIG. 12 is a partial enlarged view of a fourth structure of the balance bar shown in FIG. 8.

FIG. 12 is a partial enlarged view of a fourth structure of the balance bar shown in FIG. 8. As shown in FIG. 12, the supporting portion 132 includes a first rod body 132a and a second rod body 132b. The second rod body 132b with a diameter smaller than that of the first rod body 132a is obtained by lathing, milling, or performing another machining method on the supporting portion 132. In this case, the first rod body 132a and the second rod body 132b are each in a shape of a cylinder. After the balance bar 13 is installed on the support 12 and the baseplate 11, a second end portion 132d of the second rod body 132b is not lower than the height of the bottom surface of the first plate body 111, which can prevent the balance bar 13 from interfering with the battery 3.

Figure 13:
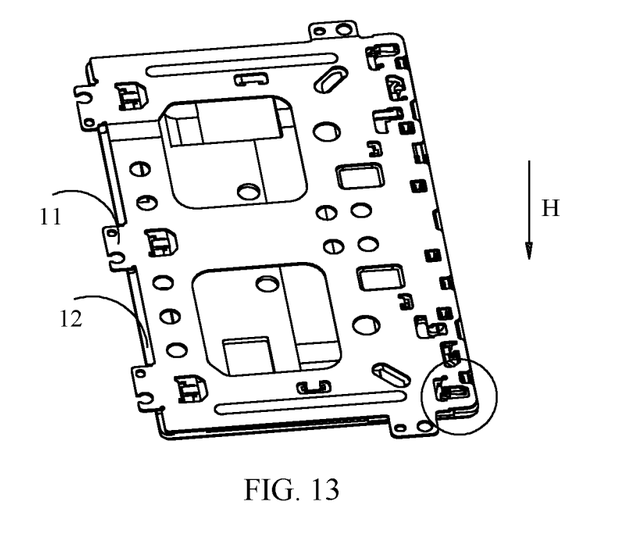
FIG. 13 is a schematic diagram of a structure of an assembled touchpad assembly according to an embodiment.

FIG. 13 is a schematic diagram of a structure of an assembled touchpad assembly according to an embodiment. As shown in FIG. 13, the baseplate 11 is clamped with the support 12.

Figure 14:
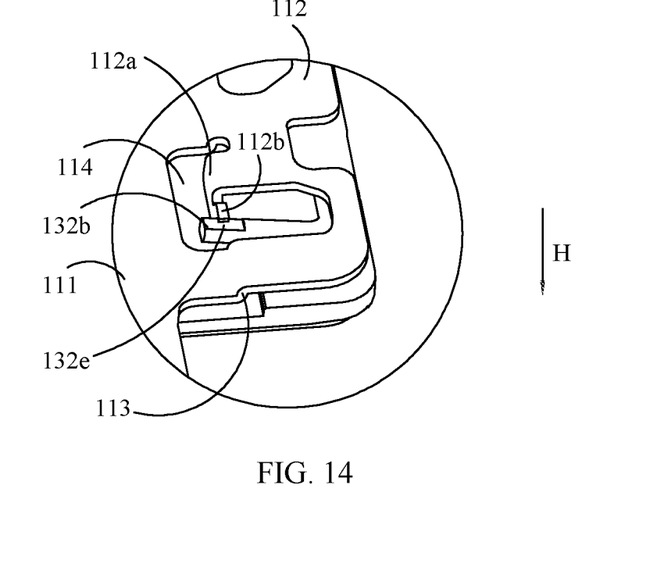
FIG. 14 is a partial enlarged view of the touchpad assembly shown in FIG. 13.

FIG. 14 is a partial enlarged view of the touchpad assembly shown in FIG. 13. As shown in FIG. 14, the baseplate 11 includes a clamping portion 112b, and a mounting portion 132e is located on the second rod body 132b and can match the clamping portion 112b to implement rotation of the supporting portion 132.

Further, the baseplate 11 is provided with a through-hole 114, and the through-hole 114 runs through the first plate body 111, the second plate body 112, and the step region 113. The second plate body 112 includes an extension plate 112a, the extension plate 112a is accommodated in the through-hole 114, and the clamping portion 112b is arranged on the extension plate 112a. The arrangement of the extension plate 112a can facilitate the arrangement of the clamping portion 112b, and the arrangement of the through-hole 114 can reduce the entire weight of the touchpad assembly.

The extension plate 112a may be integrally formed with the second plate body 112, the clamping portion 112b has a surface matching the second rod body 132b, and a fulcrum (that is, the mounting portion 132e) of the supporting portion 132 can be formed on the surface. The second rod body 132b obtained by using different machining methods has different shapes, as long as the shape of the clamping portion 112b can be adapted to the second rod body 132b, which is not limited herein.

The clamping portion 112b may further have a notch, and a shape of the notch can match the mounting portion 132e to enable the clamping portion and the mounting portion to be clamped.

Figure 15:
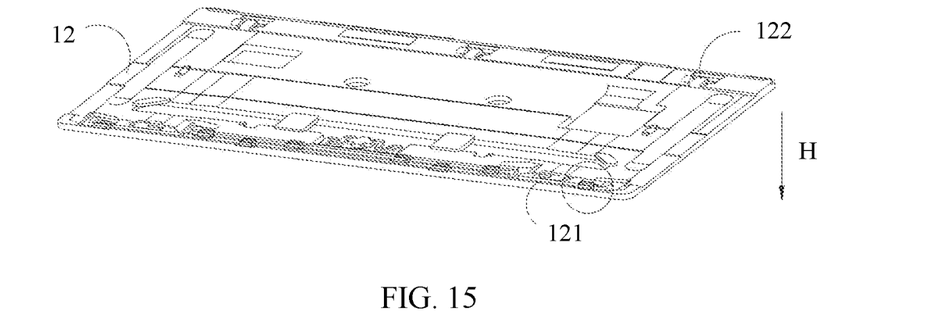
FIG. 15 is a schematic diagram of a structure of a support in a touchpad assembly according to an embodiment.
Figure 16:
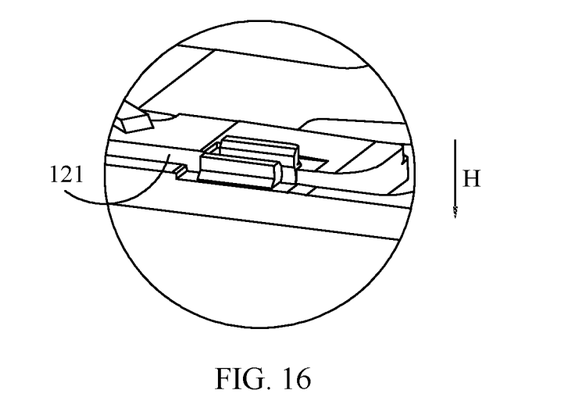
FIG. 16 is a partial enlarged view of the support shown in FIG. 15.

FIG. 15 is a schematic diagram of a structure of a support in a touchpad assembly according to an embodiment. As shown in FIG. 15, the support 12 includes a clamping groove 121, and the main body portion 131 is clamped in the clamping groove 121. There are many ways to connect the supporting portion 132 to the support 12. In a specific implementation, when the touchpad assembly 1 is pressed, the main body portion 131 can rotate in the clamping groove 121, thereby enabling the supporting portion 132 to rotate, and enabling the mounting portion 132e to match the clamping portion 112b, so that the entire touchpad assembly 1 provides good hand feeling when moving downward. FIG. 16 is a partial enlarged view of the support shown in FIG. 15. As shown in FIG. 16, a groove formed in the support 12 is a clamping groove 121, which is used to clamp the main body portion 131.

Figure 17:
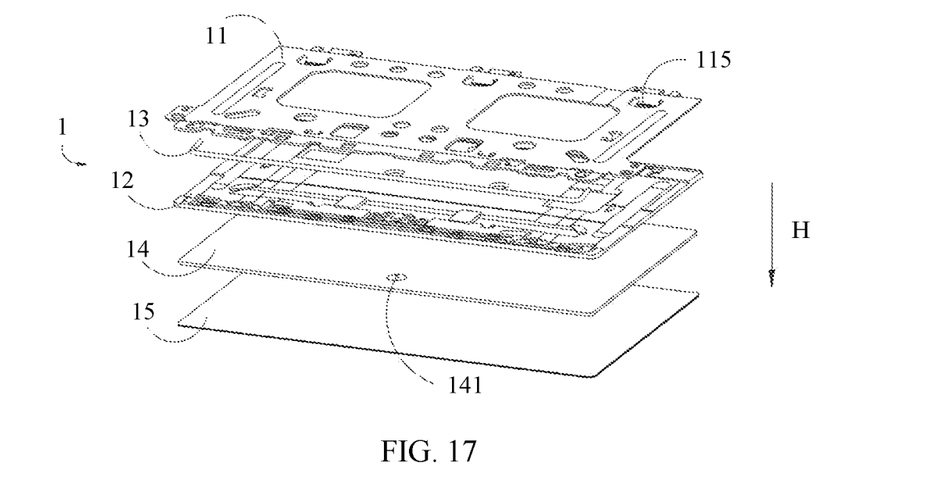
FIG. 17 is an exploded view of a touchpad assembly according to another embodiment.

FIG. 17 is an exploded view of a touchpad assembly according to another embodiment. In a specific implementation, as shown in FIG. 17, one of the baseplate 11 and the support 12 is provided with a clamping hole 115, the other is provided with a clamping block 122 (referring to FIG. 15), and the clamping hole 115 is clamped and matched with the clamping block 122, so that limiting matching between the baseplate 11 and the support 12 is implemented, or the two can be combined through bonding by using adhesive. In this embodiment, the clamping block 122 is arranged on the support 12, and the clamping hole 115 is provided in the baseplate 11.

The touchpad assembly 1 may further include a circuit board 14, where the circuit board 14 is connected to a side of the support 12 away from the baseplate 11. A switch 141 may be disposed on the circuit board 14, and the switch 141 can be attached to a surface of the circuit board 14. When the touchpad assembly 1 is pressed, the touchpad assembly 1 can rotate slightly, which triggers operation of the switch 141, to implement an input function of the keyboard 2 or a click function of a mouse.

As mentioned above, the touchpad assembly 1 according to this embodiment may further include a touchpad 15, where the touchpad 15 is disposed on a side of the circuit board 14 away from the support 12, thereby forming the touchpad assembly 1 shown in FIG. 17.

Based on the touchpad assembly 1 according to the embodiments of this disclosure, further provides an electronic device 100, where the electronic device 100 includes a display terminal 20 and a system terminal 10, and the system terminal 10 includes a keyboard 2 and the touchpad assembly 1. The touchpad assembly 1 is the touchpad assembly 1 according to any embodiment of this disclosure. The electronic device 100 further includes a battery 3. An end of the battery 3 is located on a side edge of a first plate body 111 (the side edge connected to a step region 113), and the battery 3 is located between the first plate body 111 and a lower housing.

In conclusion, in the touchpad assembly and the electronic device according to the embodiments of this disclosure, the position of the battery 3 is staggered from that of the second plate body 112, and the second end portion 132*d* of the supporting portion 132 of the balance bar 13 does not exceed the bottom surface of the first plate body 111 in the thickness direction (H) of the touchpad assembly 1. In this way, the battery 3 does not interfere with the second end portion 132*d* of the supporting portion 132, so that the touchpad assembly 1 is lighter and thinner, thereby making the entire electronic device 100 lighter and thinner.

The foregoing descriptions are merely embodiments of this disclosure, but are not intended to limit this disclosure. For a person skilled in the art, various changes and variations may be made in the embodiments. Any modification, equivalent replacement, or improvement made without departing from the spirit and principle of this disclosure shall fall within the protection scope of this disclosure.

What is claimed is:

1. A touchpad assembly for an electronic device and comprising:
    a baseplate comprising:
        a first side;
        a set fulcrum;
        a first plate body comprising a bottom surface and configured to accommodate a battery of the electronic device; and
        a second plate body, wherein the first plate body is located higher than the second plate body in a thickness direction of the touchpad assembly;
    a support disposed on the first side; and
    a balance bar supported between the support and the baseplate and configured to rotate around the set fulcrum, wherein the balance bar comprises:
        a main body portion comprising a first end and a second end; and
        supporting portions coupled to the first end and the second end,
        wherein a part of each of the supporting portions is located on the first plate body, and
        wherein a distal end of each of the supporting portions extends away from the main body portion and does not extend past the bottom surface of the first plate body in the thickness direction.

2. The touchpad assembly of claim 1, wherein each of the supporting portions comprises:
    a coupled end portion;
    a first rod body coupled to the main body portion by the coupled end portion; and
    a second rod body coupled to the first rod body, wherein a distal end portion of the second rod body extends away from the first rod body, and wherein the distal end portion does not extend past the bottom surface of the first plate body.

3. The touchpad assembly of claim 2, wherein, in the thickness direction, a second thickness of the second rod body is less than a first thickness of the first rod body.

4. The touchpad assembly of claim 2, wherein the first rod body comprises a cylinder shape, and wherein the second rod body comprises an elliptical column shape or a cylinder shape.

5. The touchpad assembly of claim 2, wherein the baseplate further comprises a clamping portion, wherein the set fulcrum is located at the clamping portion, wherein the second rod body comprises a mounting portion matching the clamping portion.

6. The touchpad assembly of claim 5, wherein the baseplate further comprises a through-hole that runs through the first plate body and the second plate body, wherein the second plate body comprises an extension plate accommodated in the through-hole, and wherein the clamping portion is disposed on the extension plate.

7. The touchpad assembly of claim 6, wherein the extension plate is integral with the second plate body.

8. The touchpad assembly of claim 1, wherein the baseplate further comprises a step region coupled between the first plate body and the second plate body.

9. The touchpad assembly of claim 1, wherein the support comprises a clamping groove, and wherein the main body portion is clamped in the clamping groove.

10. The touchpad assembly of claim 1, wherein one of the baseplate or the support comprises a clamping hole, wherein the other of the baseplate or the support that does not comprise the clamping hole comprises a clamping block, and wherein the clamping hole is configured to clamp and match with the clamping block.

11. The touchpad assembly of claim 1, further comprising a circuit board coupled to a second side of the support that is away from the baseplate.

12. The touchpad assembly of claim 11, further comprising a touchpad coupled to a third side of the circuit board that is away from the support.

13. An electronic device comprising:
    a system terminal comprising:
        a battery;
        a keyboard; and
        a touchpad assembly comprising:
            a baseplate comprising:
                a first side;
                a set fulcrum;
                a first plate body comprising a bottom surface and configured to accommodate the battery, wherein the battery is installed below the first plate body; and
                a second plate body, wherein the first plate body is located higher than the second plate body in a thickness direction of the touchpad assembly;
            a support disposed on the first side; and
            a balance bar supported between the support and the baseplate and configured to rotate around the set fulcrum, wherein the balance bar comprises:

a main body portion comprising a first end and a second end; and supporting portions coupled to the first end and the second end, wherein a part of each of the supporting portions is located on the first plate body, and wherein a distal end of each of the supporting portions extends away from the main body portion and does not extend past the bottom surface of the first plate body in the thickness direction; and a display terminal rotatably coupled to the system terminal.

14. The electronic device of claim 13, wherein the electronic device is a notebook computer.

15. The electronic device of claim 1, wherein each of the supporting portions comprises:

a coupled end portion;

a first rod body coupled to the main body portion by the coupled end portion; and a second rod body coupled to the first rod body, wherein a distal end portion of the second rod body extends away from the first rod body, and wherein the distal end portion does not extend past the bottom surface of the first plate body.

16. The electronic device of claim 15, wherein, in the thickness direction, a second thickness of the second rod body is less than a first thickness of the first rod body.

17. The electronic device of claim 15, wherein the first rod body comprises a cylinder shape, and wherein the second rod body comprises an elliptical column shape or a cylinder shape.

18. The electronic device of claim 15, wherein the baseplate further comprises a clamping portion, wherein the set fulcrum is located at the clamping portion, and wherein the second rod body comprises a mounting portion matching the clamping portion.

19. The electronic device of claim 18, wherein the baseplate further comprises a through-hole that runs through the first plate body and the second plate body, wherein the second plate body comprises an extension plate accommodated in the through-hole, and wherein the clamping portion is disposed on the extension plate.

20. The electronic device of claim 19, wherein the extension plate is integral with the second plate body.

* * * * *

UNITED STATES PATENT AND TRADEMARK OFFICE
CERTIFICATE OF CORRECTION

PATENT NO. : 11,720,187 B2
APPLICATION NO. : 17/827319
DATED : August 8, 2023
INVENTOR(S) : Yingchun Zhang et al.

It is certified that error appears in the above-identified patent and that said Letters Patent is hereby corrected as shown below:

In the Claims

Claim 15, Column 13, Line 14: "claim 1" should read "claim 13"

Signed and Sealed this
Third Day of October, 2023

Katherine Kelly Vidal
*Director of the United States Patent and Trademark Office*